(12) United States Patent
Hatanaka et al.

(10) Patent No.: US 10,699,479 B2
(45) Date of Patent: Jun. 30, 2020

(54) APPARATUS AND METHOD FOR GENERATING BIOLOGICAL MODEL

(71) Applicant: FUJITSU LIMITED, Kawasaki-shi, Kanagawa (JP)

(72) Inventors: Kohei Hatanaka, Fujisawa (JP); Machiko Nakagawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/572,630

(22) Filed: Sep. 17, 2019

(65) Prior Publication Data

US 2020/0013218 A1 Jan. 9, 2020

Related U.S. Application Data

(63) Continuation of application No. PCT/JP2017/012089, filed on Mar. 24, 2017.

(51) Int. Cl.
 *G06T 17/20* (2006.01)
 *G06T 7/00* (2017.01)
 *G06T 7/149* (2017.01)

(52) U.S. Cl.
 CPC .......... *G06T 17/205* (2013.01); *G06T 7/0012* (2013.01); *G06T 7/149* (2017.01);
 (Continued)

(58) Field of Classification Search
 None
 See application file for complete search history.

(56) References Cited

U.S. PATENT DOCUMENTS 8,155,411 B2 * 4/2012 Hof ..................... G06T 7/0012
 382/128
9,042,611 B2 * 5/2015 Blezek .................. G06T 7/162
 382/128

(Continued)

FOREIGN PATENT DOCUMENTS

| JP | 2007-537815 A | 12/2007 |
| JP | 2015-108989 A | 6/2015 |
| WO | 2005/114575 A1 | 12/2005 |

OTHER PUBLICATIONS

International Search Report and Written Opinion dated May 16, 2017 for PCT/JP2017/012089 filed on Mar. 24, 2017, 7 pages including English Translation of the International Search Report.

(Continued)

*Primary Examiner* — Said Broome
(74) *Attorney, Agent, or Firm* — Xsensus LLP

(57) ABSTRACT

A biological model generating apparatus establishes, for each of a plurality of nodes on a centerline of a blood vessel, based on blood vessel information, a first circle and a second circle on a plane cutting through the node and intersecting the centerline at a right angle. The first circle centers at the node and has a first radius obtained by adding a margin of error to the radius of the blood vessel. The second circle centers at the node and has a second radius obtained by subtracting the margin of error from the radius. Subsequently, the generating apparatus generates an implicit function defining a curved surface that intersects the plane cutting through each of the plurality of nodes, at the inner side of the first circle but the outer side of the second circle. Then, the generating apparatus generates a mesh model based on the defined curved surface.

6 Claims, 16 Drawing Sheets

(52) U.S. Cl.
CPC .............. *G06T 2200/04* (2013.01); *G06T 2207/10081* (2013.01); *G06T 2207/10088* (2013.01); *G06T 2207/30101* (2013.01)

(56) References Cited

U.S. PATENT DOCUMENTS

| | | |
|---|---|---|
| 9,109,391 B2 * | 8/2015 | Beck .................. E06B 5/161 |
| 2008/0094389 A1 | 4/2008 | Rouet et al. |
| 2014/0364739 A1 | 12/2014 | Liu et al. |
| 2015/0161297 A1 | 6/2015 | Ataka et al. |

OTHER PUBLICATIONS

Au et al., "Skeleton Extraction by Mesh Contraction", SIGGRAPH '08, ACM, New York, USA, Aug. 11-15, 2008, 11 pages.

Desbrun et al., "Implicit Failing of Irregular Meshes using Diffusion and Curvature Flow", SIGGRAPH '99, ACM Press/Addison-Wesley Publishing Co., New York, USA, Jul. 1, 1999, 10 pages.

Lorensen et al., "Marching Cubes: A High Resolution 3d Surface Construction Algorithm", SIGGRAPH '87, Computer Graphics, vol. 21, No. 4, Anaheim, Jul. 27-31, 1987, pp. 163-169.

Vallet et al., "Spectral Geometry Processing with Manifold Harmonics", vol. 27, No. 2, Apr. 24, 2008, 11 pages.

Yang et al., "Automatic centerline extraction of coronary arteries in coronary computed tomographic angiography", Int J. Cardiovasc Imaging , Jun. 3, 2011, pp. 921-933.

* cited by examiner

APPARATUS AND METHOD FOR GENERATING BIOLOGICAL MODEL

CROSS-REFERENCE TO RELATED APPLICATION

This application is a continuation application of International Application PCT/JP2017/012089 filed on Mar. 24, 2017 which designated the U.S., the entire contents of which are incorporated herein by reference.

FIELD

The embodiments discussed herein are related to an apparatus and method for generating a biological model.

BACKGROUND

Amongst human body organs, blood vessels have a fundamental role in transporting blood throughout the human body. Amid growing cooperation between medicine and engineering, it has been seen in recent years that not only organ observations but also analyses of organ dynamics would provide important information for diagnoses. For this reason, dynamics analyses of organs, such as the heart, have been undertaken, using computer simulations. Examples of such computer-based dynamics analyses include dynamics analyses to assess the risks of stenosis and aneurysm. In conducting this kind of analysis, a three-dimensional mesh model is created which reproduces a vascular shape using a polygon mesh. For example, in the case of conducting a dynamics analysis of a coronary artery, a mesh model of the coronary artery is created.

In general, a mesh model of a coronary artery is generated in the following procedure, using a computer. The computer first extracts data of a blood vessel region from medical images from magnetic resonance imaging (MRI) or computed tomography (CT) scans. The extracted data is a set of voxels where, for example, a luminance value of 1 is assigned to each voxel in a target region while each voxel in a non-target region has a luminance value of 0. Next, the computer creates a polygon mesh from the extracted data using, for example, marching cubes.

Note that, due to its limitations on spatio-temporal resolution, medical imaging is prone to excessive noise (artifacts) when a moving organ like a heart is an imaging target. Such noise gives the surface of the created mesh model an exaggerated rough appearance. Therefore, image processing, such as smoothing, is used to make a coronary artery have a biologically plausible morphology. Then, after such processing, a mesh model of the coronary artery is eventually created.

See, for example, the following documents:

William E. Lorensen and Harvey E. Cline, "Marching Cubes: A high resolution 3D surface construction algorithm", Computer Graphics, Vol. 21, No. 4, July 1987, pp. 163-169;

B. Vallet and B. Levy., "Spectral Geometry Processing with Manifold Harmonics", Computer Graphics Forum (proc. Eurographics), 24 Apr. 2008, pp. 251-260;

Mathieu Desbrun, Mark Meyer, Peter Schroder, and Alan H. Barr, "Implicit Fairing of Irregular Meshes Using Diffusion and Curvature Flow", Proceedings of the 26th Annual Conference on Computer Graphics and Interactive Techniques (SIGGRAPH '99), ACM Press/Addison-Wesley Publishing Co., 1999-07-01, pp. 317-324;

Guanyu Yang, Pieter Kitslaar, Michel Frenay, Alexander Broersen, Mark J. Boogers, Jeroen J. Bax, Johan H. C. Reiber, and Jouke Dijkstra, "Automatic centerline extraction of coronary arteries in coronary computed tomographic angiography", The International Journal of Cardiovascular Imaging, April 2012, Volume 28, Issue 4, pp. 921-933; and Oscar Kin-Chung Au, Chiew-Lan Tai, Hung-Kuo Chu., Daniel Cohen-Or, D., and Tong-Yee Lee, "Skeleton extraction by mesh contraction", ACM Transactions on Graphics—Proceedings of ACM SIGGRAPH 2008, August 2008, Volume 27 Issue 3, Article No. 44.

However, conventional mesh model generation approaches sometimes produce mesh models of blood vessels morphed into unnatural shapes. For example, smoothing on a mesh may introduce changes in the radii of the blood vessels. Examples of mesh smoothing methods include the Laplacian smoothing and mean curvature flow; however, it is known that, when applied to a mesh surface, these mesh smoothing methods develop unnatural deformations of the mesh surface in the direction in which the surface area decreases. Therefore, employing these methods to sufficiently smooth the surface of the blood vessels results in unnaturally reduced vascular diameters. Using a mesh model thus produced in fluid simulation compromises the accuracy of the simulation.

SUMMARY

According to one aspect, there is provided a biological model generating apparatus including a memory configured to store blood vessel information indicating a centerline of a blood vessel and radii of the blood vessel at a plurality of nodes on the centerline; and a processor configured to execute a process including establishing, with respect to each of the plurality of nodes, based on the blood vessel information, a first circle and a second circle on a plane cutting through the node and intersecting the centerline at a right angle, the first circle centering at the node and having a first radius obtained by adding a margin of error to the radius of the blood vessel at the node, and the second circle centering at the node and having a second radius obtained by subtracting the margin of error from the radius of the blood vessel at the node, generating an implicit function defining a curved surface that intersects the plane cutting through each of the plurality of nodes, at an inner side of the first circle but an outer side of the second circle, and generating a mesh model based on the curved surface defined by the implicit function.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Several embodiments will be described below with reference to the accompanying drawings. These embodiments may be combined with each other, unless they have contradictory features.

(a) First Embodiment

The description begins with a first embodiment. The first embodiment is directed to generating a mesh model representing natural vascular shape (i.e., more faithful to the morphology of blood vessels) by defining curved surfaces based on information on the centerlines and radii of the blood vessels with the use of implicit functions and performing modeling of the blood vessels.

Figure 1:
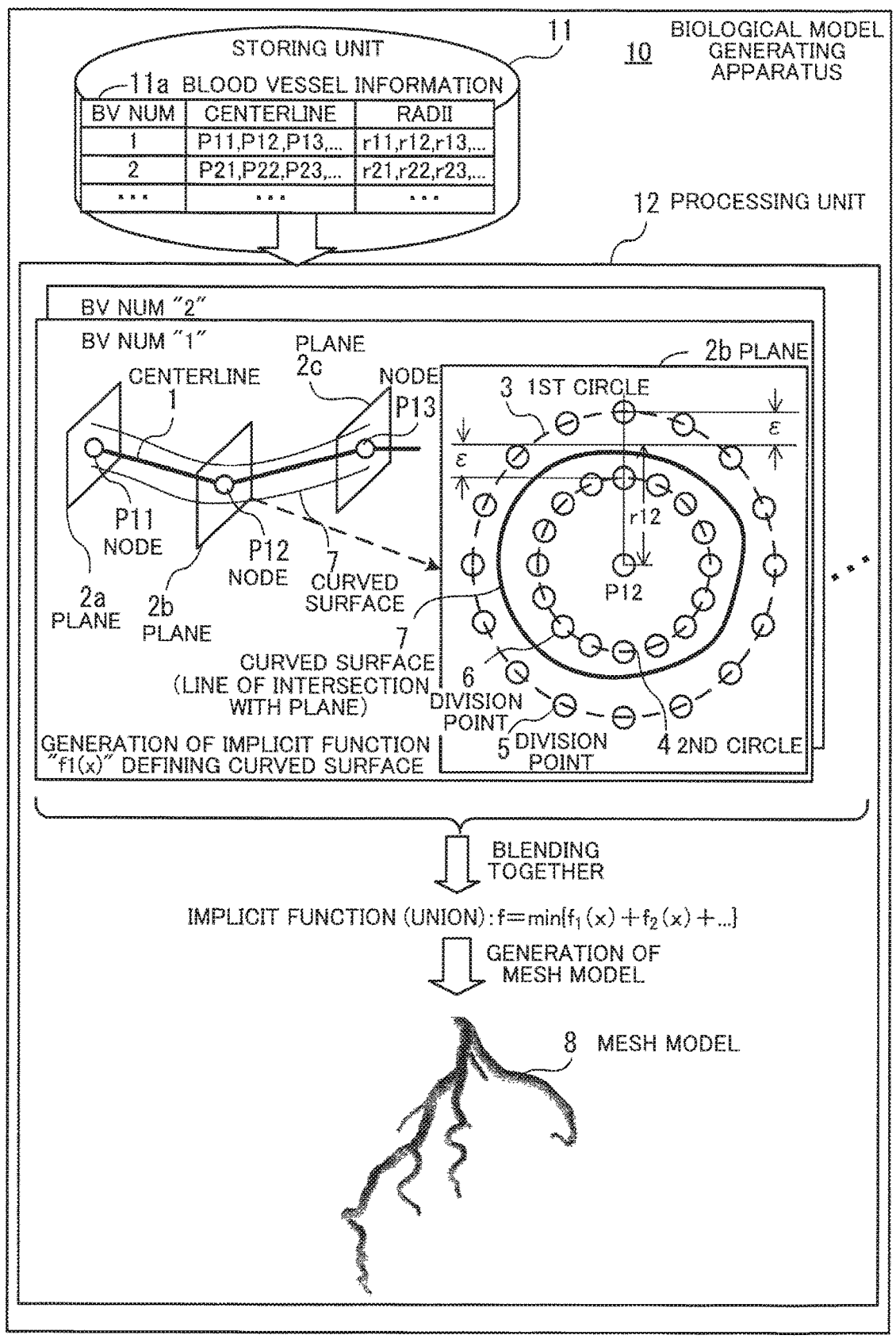
FIG. 1 illustrates an exemplary biological model generating apparatus according to a first embodiment.

FIG. 1 illustrates an exemplary biological model generating apparatus according to the first embodiment. A biological model generating apparatus 10 includes a storing unit 11 and a processing unit 12. The storing unit 11 is, for example, a memory or other storage device provided in the biological model generating apparatus 10. The processing unit 12 is, for example, an arithmetic processing unit, such as a processor, provided in the biological model generating apparatus 10.

The storing unit 11 stores therein blood vessel information 11a that maps, to a blood vessel number (BV NUM) of each of a plurality of blood vessels, a centerline of the blood vessel and radii of the blood vessel at a plurality of nodes on the centerline. The centerline is represented by, for example, an array of coordinates of the nodes. In this case, a line connecting the coordinates of the nodes in the sequence that they occur in the array is the centerline. Note that the centerlines and radii of the blood vessels are obtained using, for example, a computer aided diagnosis (CAD) system. In the CAD system, a functionality of extracting blood vessels, such as a coronary artery, from medical images is implemented. A blood vessel portion is extracted from medical images using the CAD system and measurements are made on the extracted blood vessel portion, to thereby acquire the centerlines and radii of the blood vessels.

In the case of performing modeling of a network of blood vessels branching off a major blood vessel, like a coronary artery, the blood vessel information 11a stored in the storing unit 11 is organized, for example, into individual blood vessels, each extending from the root of the network (e.g. the ostia of an artery through which blood flows into the artery) to one of a plurality of distal branches. In this case, the plurality of blood vessels included in the blood vessel information 11a shares, for example, a common nodal position (a position corresponding to the root) at their one ends.

The processing unit 12 generates, based on the blood vessel information 11a, a mesh model 8 of blood vessels by a biological model generating method described below. For example, the processing unit 12 generates the blood vessel mesh model 8 by executing a biological model generating program describing processing procedures of the following biological model generating method.

Assume here that a plurality of nodes P11, P12, P13, and so on are defined along a centerline 1 of a blood vessel with a blood vessel number of "1". With respect to the individual nodes P11, P12, P13, and so on, the processing unit 12 first generates planes 2a, 2b, 2c, and so on cutting through the nodes P11, P12, P13, and so on, respectively, and intersecting the centerline 1 at a right angle. Then, the processing unit 12 establishes a first circle 3 and a second circle 4 on each of the generated planes 2a, 2b, 2c, and so on. The first circle 3 centers at the corresponding one of the nodes P11, P12, P13, and so on, and has a first radius obtained by adding a margin of error ε to the radius of the blood vessel at the corresponding node. The second circle 4 also centers at the corresponding node and has a second radius obtained by subtracting the margin of error ε from the radius of the blood vessel at the corresponding node. Note that the margin of error ε represents the maximum acceptable difference from the radius of the blood vessel, indicated by the blood vessel information 11a, in the mesh model 8 to be created. The margin of error ε is set in advance to a value greater than 0 and less than the radius of the blood vessel.

Further, the processing unit 12 generates an implicit function defining a curved surface 7 that intersects each of the planes 2a, 2b, and 2c (cutting through the nodes P11, P12, P13, respectively) at the inner side of the first circle 3 but the outer side of the second circle 4. For example, the processing unit 12 arranges a plurality of division points 5 and 6 on the first circle 3 and the second circle 4 of each of the planes 2a, 2b, and 2c, and generates an implicit function based on the division points 5 and 6. FIG. 1 depicts a line of intersection of the plane 2b and the curved surface 7. The line of intersection is located inside of the first circle 3 but outside of the second circle 4.

The processing unit 12 performs the above-described process of generating an implicit function for each of the plurality of blood vessels. As a result, with respect to each blood vessel, an implicit function is generated, which defines a curved surface representing the morphology of the blood vessel.

The processing unit 12 blends together the implicit functions generated for the individual blood vessels. For example, the processing unit 12 generates an implicit function which represents the union of a plurality of surfaces defined by the implicit functions corresponding to the plurality of blood vessels. Then, the processing unit 12 generates the mesh model 8 based on the surface defined by the generated implicit function. The mesh model 8 represents the shape created by eliminating, when the curved surfaces defined by the implicit functions of the individual blood vessels are assembled together, a portion of the curved surface of each blood vessel, which is located internally in another blood vessel. In other words, the mesh model 8 represents the shape where, of overlapping tubular curved surfaces, only the external surface remains.

The above-described procedure allows generating the mesh model 8 which represents the natural morphology of blood vessels. That is, in generating an implicit function of each of a plurality of blood vessels, the implicit function is generated in such a manner as to define, based on each radius of the blood vessel, the curved surface 7 lying within the margin of error ε around the radius. This prevents the occurrence of unnaturally narrow portions in the mesh model 8. In addition, the generation of the implicit function with the acceptable range given by the margin of error ε allows the smooth curved surface 7 to be defined.

For example, setting the margin of error ε to one-half the radius of the blood vessel eliminates the possibility that the shape of the curved surface defined by the generated implicit function would have a radius smaller than one-half the radius indicated by the blood vessel information 11*a*. This prevents the occurrence of significantly narrow portions in the mesh model 8. The smaller the margin of error ε, the more accurately the radius indicated by the blood vessel information 11*a* is reflected into the mesh model 8; however, this may result in loss of smoothness in the curved surface 7. In view of this, by setting the margin of error ε to, for example, a value obtained by multiplying the minimum radius of the blood vessel by 0.1, it is possible to secure smoothness of the curved surface 7 while preventing the occurrence of significantly narrow portions in the generated mesh model 8.

Further, according to the first embodiment, implicit functions are generated to individually define smooth curved surfaces of a plurality of blood vessels, and then the generated implicit functions are blended together. This prevents branching parts of the blood vessels in the mesh model 8 from being unnaturally rounded, thus accurately reconstructing the branching parts.

Note that the first embodiment describes the case of generating the mesh model 8 representing a branching blood vessel network; however, it is also possible to generate a mesh model of a single blood vessel with no branches. In this case, the processing unit 12 generates a mesh model representing the single blood vessel by performing no blending of implicit functions and producing a polygon mesh along a surface defined by an implicit function generated based on the centerline and radii of the blood vessel. By generating the mesh model of the single blood vessel in this manner, it is possible to reproduce the natural morphology of the blood vessel with a smooth surface but no unnaturally narrow portions.

(b) Second Embodiment

Next described is a second embodiment. The second embodiment is directed to performing modeling of a coronary artery for use in cardiac coronary artery simulation.

Figure 2:
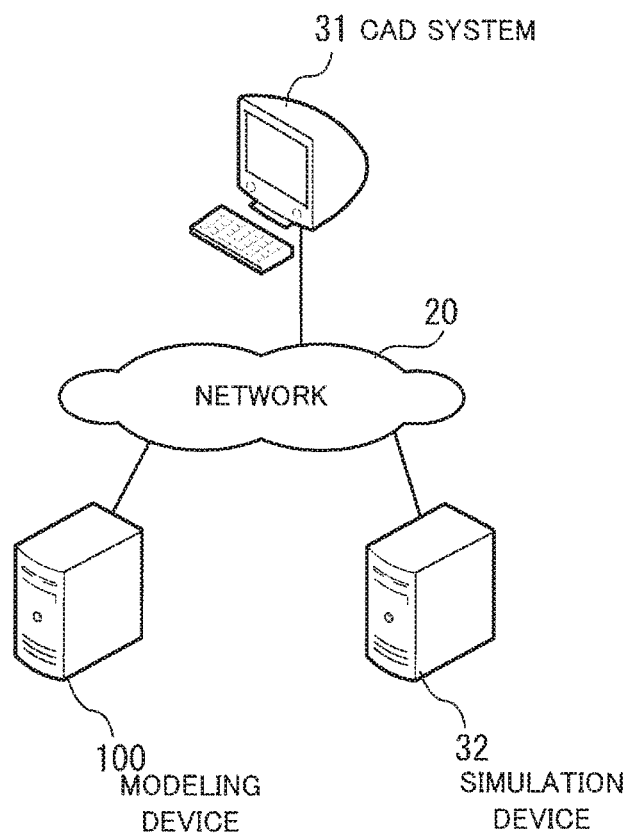
FIG. 2 illustrates an exemplary system structure according to a second embodiment.

FIG. 2 illustrates an exemplary system structure according to the second embodiment. A modeling device 100 is connected to a CAD system 31 and a simulation device 32 via a network 20.

The CAD system 31 is a computer for supporting a diagnosis based on medical images produced by MRI or CT scan. The CAD system 31 is capable of measuring, for example, the centerlines and radii of a coronary artery on cardiac tomographic images.

The simulation device 32 is a computer for simulating the heartbeat and cardiac blood flow. For example, the simulation device 32 performs a fluid simulation for blood flowing through a coronary artery using a mesh model of the coronary artery.

The modeling device 100 is a computer for creating a three-dimensional (3D) heart model based on data pertaining to cardiac structure, created by the CAD system 31. For example, the modeling device 100 creates a mesh model representing a 3D structure of a coronary artery based on blood vessel information regarding the coronary artery. The modeling device 100 transmits the created coronary artery mesh model to the simulation device 32. Then, the simulation device 32 uses the coronary artery mesh model to, for example, perform a fluid simulation of blood flows.

Figure 3:
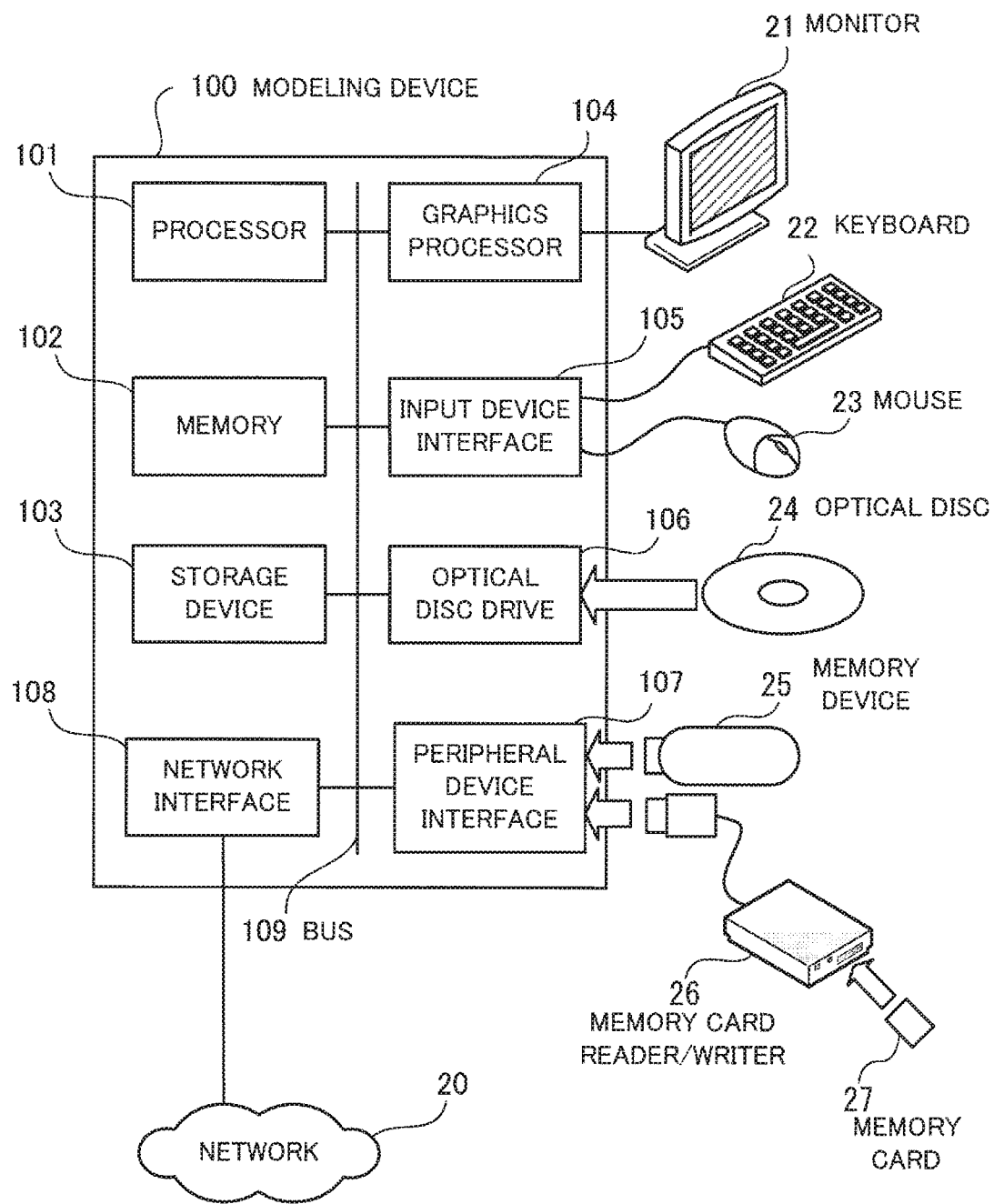
FIG. 3 illustrates an exemplary hardware platform of a modeling device used in the second embodiment.

FIG. 3 illustrates an exemplary hardware platform of a modeling device used in the second embodiment. The modeling device 100 has a processor 101 to control its entire operation. The processor 101 is connected to a memory 102 and other various devices and interfaces via a bus 109. The processor 101 may be a single processing device or a multiprocessor system including two or more processing devices, such as a central processing unit (CPU), micro processing unit (MPU), and digital signal processor (DSP). It is also possible to implement processing functions of the processor 101 and its programs wholly or partly into an application-specific integrated circuit (ASIC), programmable logic device (PLD), or other electronic circuits, or any combination of them.

The memory 102 serves as the primary storage device in the modeling device 100. Specifically, the memory 102 is used to temporarily store at least some of the operating system (OS) programs and application programs that the processor 101 executes, as well as various types of data to be used by the processor 101 for its processing. For example, the memory 102 may be implemented using a random access memory (RAM) or other volatile semiconductor memory devices.

Other devices on the bus 109 include a storage device 103, a graphics processor 104, an input device interface 105, an optical disc drive 106, a peripheral device interface 107, and a network interface 108.

The storage device 103 writes and reads data electrically or magnetically in or on its internal storage medium. The storage device 103 serves as a secondary storage device in the modeling device 100 to store program and data files of the operating system and applications. For example, the storage device 103 may be implemented using hard disk drives (HDD) or solid state drives (SSD).

The graphics processor 104, coupled to a monitor 21, produces video images in accordance with drawing commands from the processor 101 and displays them on a screen of the monitor 21. The monitor 21 may be, for example, a cathode ray tube (CRT) display or a liquid crystal display.

The input device interface 105 is connected to input devices, such as a keyboard 22 and a mouse 23, and supplies signals from those devices to the processor 101. The mouse 23 is a pointing device, which may be replaced with other kinds of pointing devices, such as a touchscreen, tablet, touchpad, and trackball.

The optical disc drive 106 reads out data encoded on an optical disc 24, by using laser light. The optical disc 24 is a portable storage medium on which data is recorded in such a manner as to be read by reflection of light. The optical disc 24 may be a digital versatile disc (DVD), DVD-RAM, compact disc read-only memory (CD-ROM), CD-Recordable (CD-R), or CD-Rewritable (CD-RW), for example.

The peripheral device interface 107 is a communication interface used to connect peripheral devices to the modeling device 100. For example, the peripheral device interface 107 may be used to connect a memory device 25 and a memory card reader/writer 26. The memory device 25 is a data storage medium having a capability to communicate with the peripheral device interface 107. The memory card reader/writer 26 is an adapter used to write data to or read data from a memory card 27, which is a data storage medium in the form of a small card.

The network interface 108 is connected to the network 20 so as to exchange data with other computers or communication devices (not illustrated).

The above-described hardware platform may be used to implement the processing functions of the modeling device 100 according to the second embodiment. The same hardware configuration of the modeling device 100 of FIG. 3 may similarly be applied to the foregoing biological model generating apparatus 10 of the first embodiment.

The modeling device 100 provides various processing functions of the second embodiment by, for example, executing computer programs stored in a computer-readable storage medium. A variety of storage media are available for recording programs to be executed by the modeling device 100. For example, the modeling device 100 may store program files in its own storage device 103. The processor 101 reads out at least part of those programs from the storage device 103, loads them into the memory 102, and executes the loaded programs. Other possible storage locations for the programs include the optical disc 24, the memory device 25, the memory card 27, and other portable storage media. The programs stored in such a portable storage medium are installed in the storage device 103 under the control of the processor 101, so that they are ready to be executed upon request. It may also be possible for the processor 101 to execute program codes read out of a portable storage medium, without installing them in its local storage devices.

Figure 4:
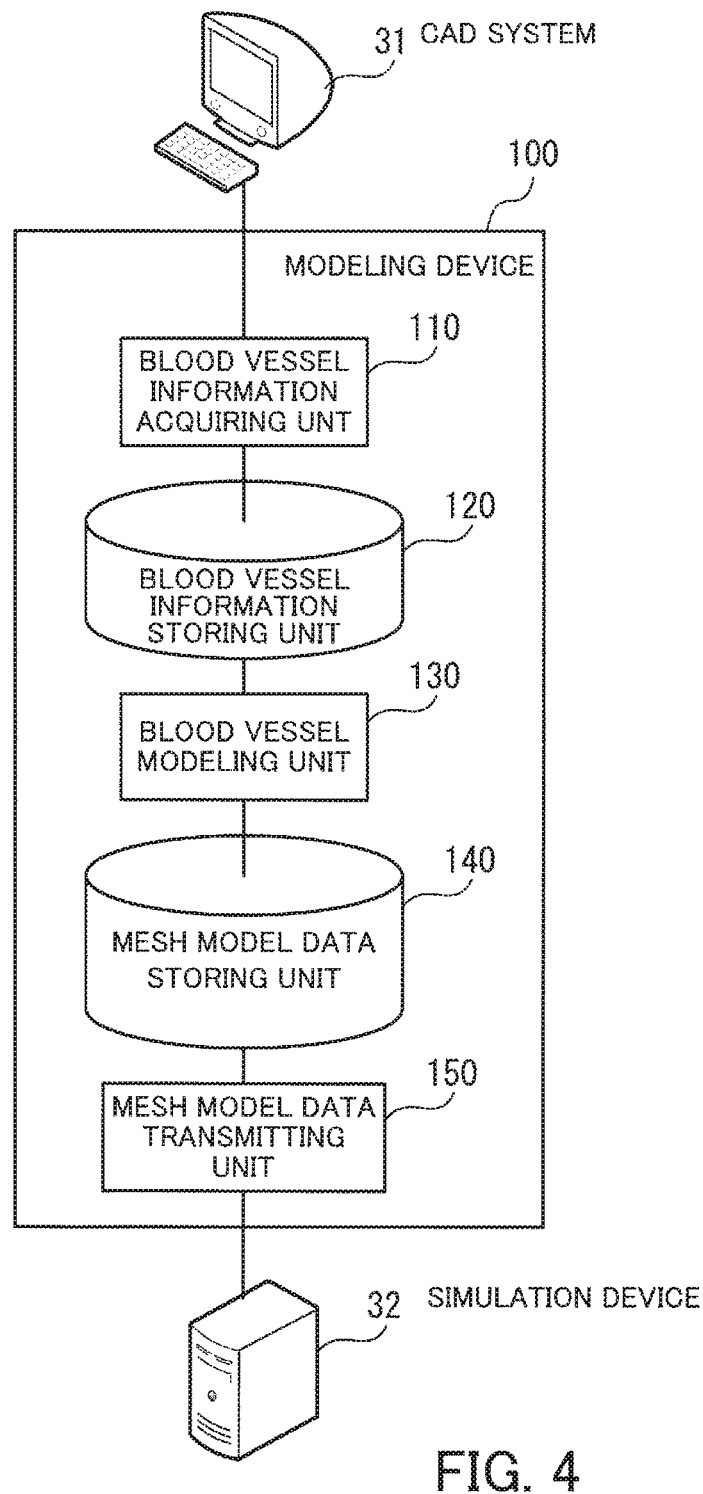
FIG. 4 is a block diagram illustrating exemplary functions of the modeling device, associated with generating a coronary artery mesh model.

FIG. 4 is a block diagram illustrating exemplary functions of the modeling device, associated with generating a coronary artery mesh model. The modeling device 100 includes a blood vessel information acquiring unit 110, a blood vessel information storing unit 120, a blood vessel modeling unit 130, a mesh model data storing unit 140, and a mesh model data transmitting unit 150.

The blood vessel information acquiring unit 110 acquires, from CAD data pertaining to the shape of a coronary artery, created by the CAD system 31, blood vessel information regarding the coronary artery. The blood vessel information acquiring unit 110 stores the acquired blood vessel information in the blood vessel information storing unit 120. The blood vessel information includes, for example, centerline data indicating centerlines of blood vessels and radius data indicating radii of the blood vessels. Note that the centerlines are extracted, for example, by generating a mesh from 3D voxel data created by the CAD system 31 using marching cubes, and then employing the technique described in the above-cited literature "Skeleton extraction by mesh contraction". For example, the blood vessel information acquiring unit 110 performs such centerline data extraction processing on the CAD data representing the shape of the coronary artery to thereby acquire the blood vessel information.

The blood vessel information storing unit 120 stores the blood vessel information regarding the coronary artery. The blood vessel information storing unit 120 is implemented using, for example, part of the memory area of the memory 102 or the storage device 103 in the modeling device 100.

The blood vessel modeling unit 130 generates a mesh model of the coronary artery based on the blood vessel information regarding the coronary artery, stored in the blood vessel information storing unit 120. The blood vessel modeling unit 130 stores mesh model data representing the generated mesh model in the mesh model data storing unit 140.

The mesh model data storing unit 140 stores the mesh model data. The mesh model data storing unit 140 is implemented using, for example, part of the memory area of the memory 102 or the storage device 103 in the modeling device 100.

The mesh model data transmitting unit 150 transmits the mesh model data to the simulation device 32.

It is noted that the solid lines interconnecting functional blocks in FIG. 4 represent some of their communication paths. A person skilled in the art would appreciate that there may be other communication paths in actual implementations. Each functional block seen in FIG. 4 may be implemented as a program module, so that a computer executes the program module to provide its encoded functions.

Figure 5:
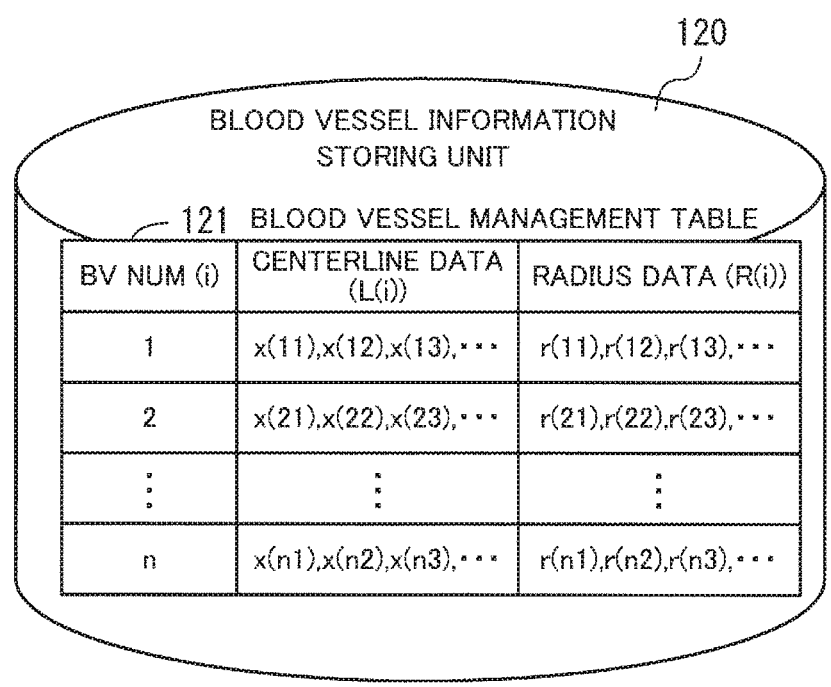
FIG. 5 illustrates exemplary blood vessel information stored in a blood vessel information storing unit.
Figure 6:
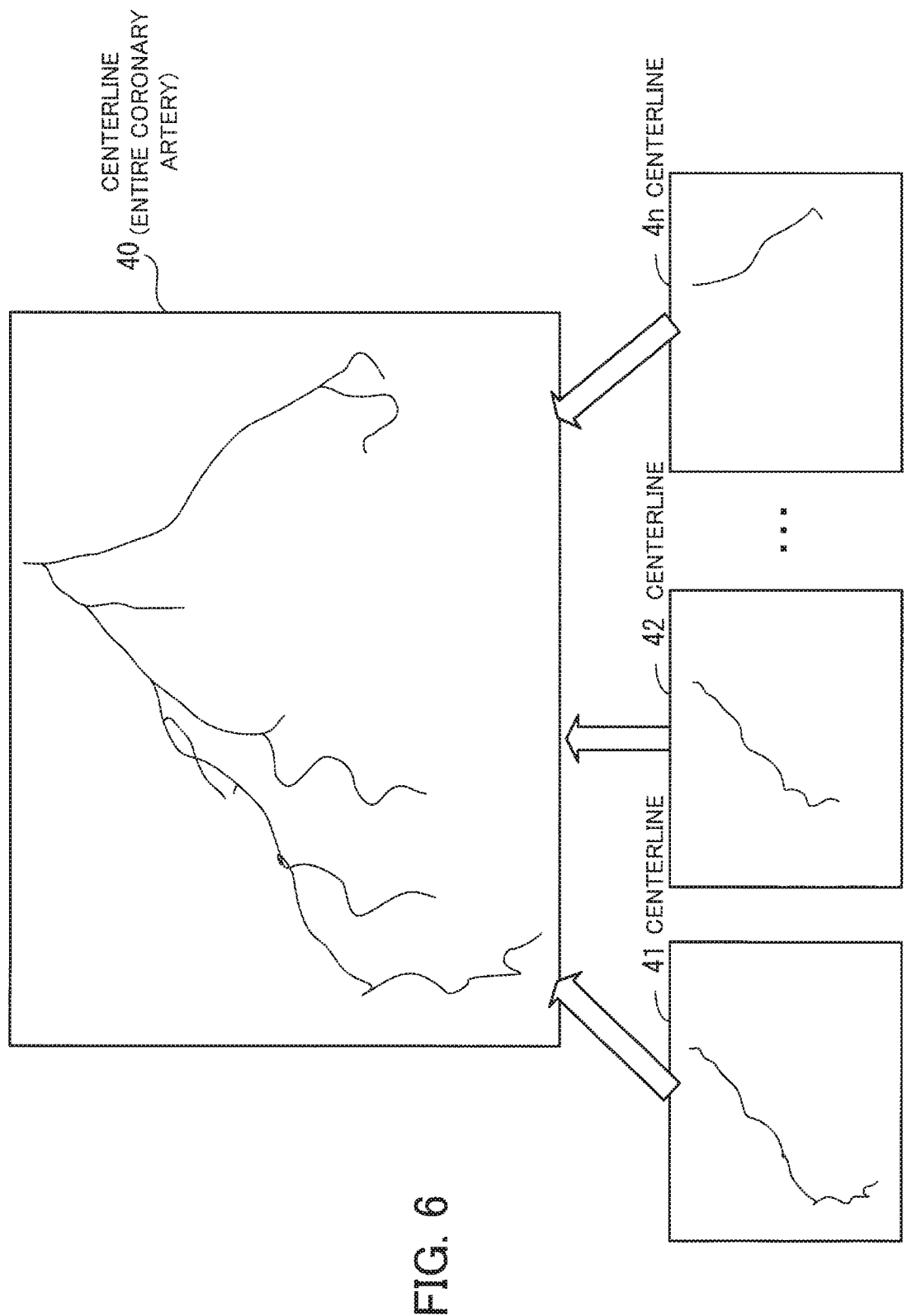
FIG. 6 illustrates exemplary centerlines of blood vessels.
Figure 7:
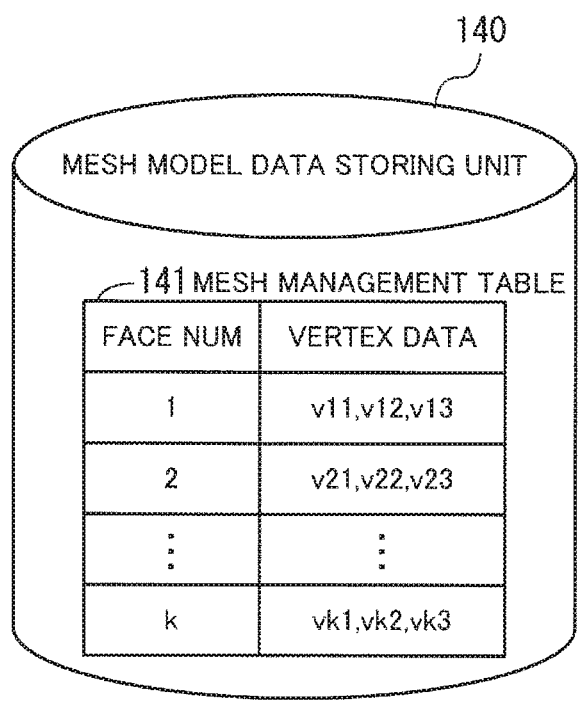
FIG. 7 illustrates exemplary blood vessel information stored in a mesh model data storing unit.

The following description now provides specifics of information stored in the modeling device 100, with reference to FIGS. 5 to 7.

FIG. 5 illustrates exemplary blood vessel information stored in the blood vessel information storing unit. The blood vessel information storing unit 120 includes, for example, a blood vessel management table 121. The blood vessel management table 121 stores therein centerline data and radius data in association with a blood vessel number (BV NUM) of each of a plurality of blood vessels.

According to the second embodiment, the blood vessel information is expressed in the following form: $\{(L(i), R(i))\}$ (i=0, ..., and n−1), where i is the number of a blood vessel, n is the count of blood vessels and an integer greater than or equal to 1, and L(i) is the data indicating a polyline representing the centerline of the $i^{th}$ blood vessel (centerline data). The centerline data is expressed in the following form: $L(i)=(x(i0), x(i1), \ldots,$ and $x(im−1))$, where $x(ij)$ is the coordinates of the $j^{th}$ node on the centerline of the $i^{th}$ blood vessel in 3D space (j is an integer greater than or equal to 1). A line segment connecting the coordinates of $x(j)$ and $x(j+1)$, which are sequential values of the index number j, is the centerline of the blood vessel. R(i) is the data indicating radius information of the $i^{th}$ blood vessel (radius data). The radius data is expressed in the following form: $R(i)=(r(i1), r(i2), \ldots,$ and $r(im))$, where $r(j)$ represents the radius value in relation to the centerline at $x(j)$, and im is the number of nodes of line segment data associated with the $i^{th}$ blood vessel (im is an integer greater than or equal to 1).

A plurality of blood vessels represented by a plurality of pairs of centerline data and radius data is combined, to thereby represent blood vessels of the entire coronary artery.

FIG. 6 illustrates exemplary centerlines of blood vessels. As depicted in FIG. 6, a centerline 40 of the entire coronary artery is represented by an assembly of a plurality of centerlines 41, 42, ..., and 4n. The centerlines 41, 42, ..., and 4n individually start from the root of the centerline 40 of the entire coronary artery (the ostia of the artery through which blood flows into the artery) and represent paths of the blood vessels to distal branches of the coronary artery.

As illustrated in FIG. 6, because the centerlines 41, 42, ..., and 4n start from the same point, there are overlaps among the blood vessels individually represented by the centerlines 41, 42, ..., and 4n. The centerlines 41, 42, ..., and 4n are joined together while the overlaps in the blood vessels are eliminated, to thereby form the centerline 40 of the entire coronary artery.

FIG. 7 illustrates exemplary blood vessel information stored in the mesh model data storing unit. The mesh model data storing unit 140 includes, for example, a mesh management table 141. The mesh management table 141 stores therein each vertex data entry representing 3D coordinates of three vertices of a corresponding face which makes up a polygon mesh, in association with the number of the face ("FACE NUM" in FIG. 7).

Next, a process of generating a coronary artery mesh model is explained in detail.

Figure 8:
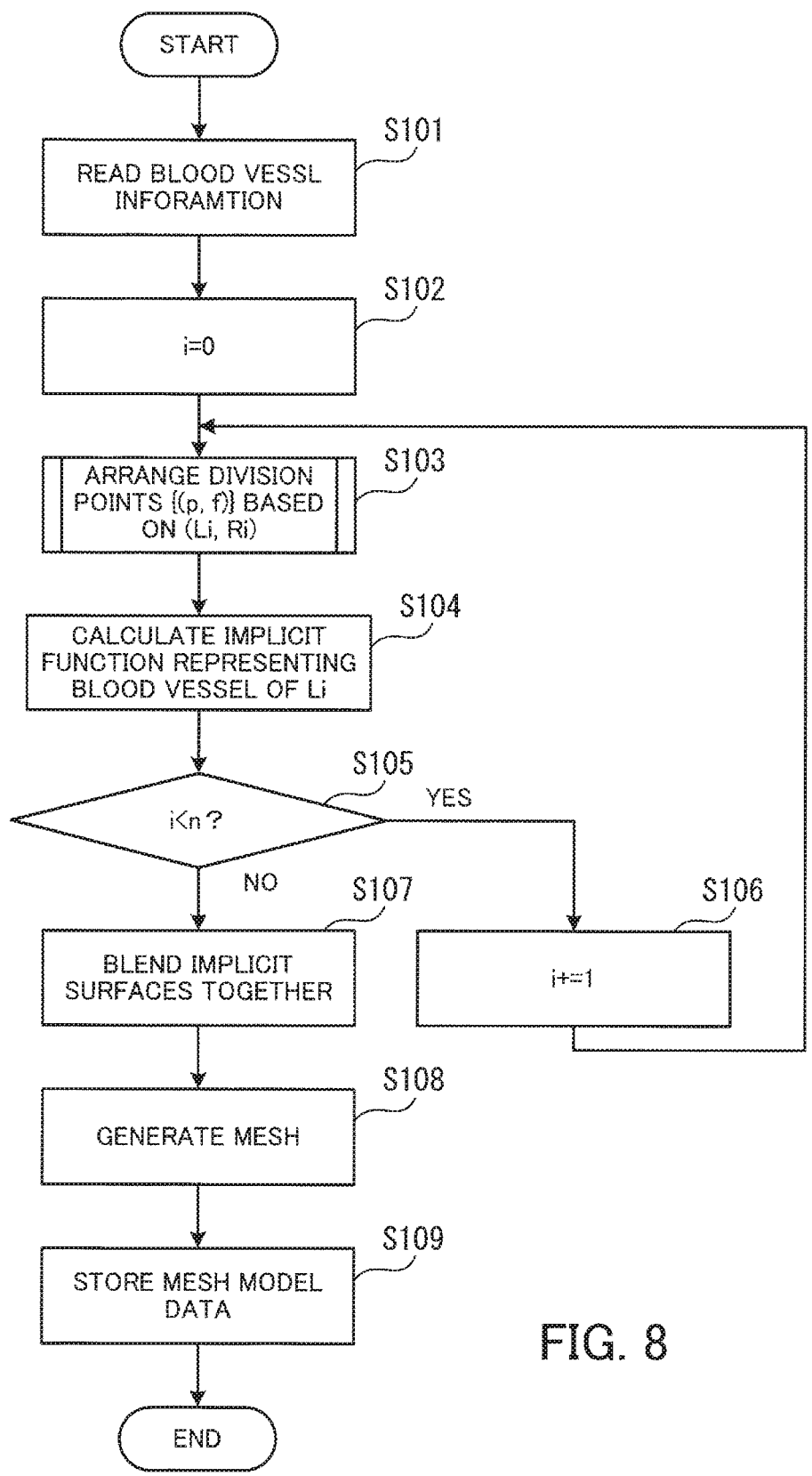
FIG. 8 is a flowchart illustrating an exemplary procedure of a coronary artery mesh model generating process.

FIG. 8 is a flowchart illustrating an exemplary procedure of the coronary artery mesh model generating process. The process of FIG. 8 is described according to the step numbers in the flowchart.

[Step S101] The blood vessel modeling unit 130 reads blood vessel information from the blood vessel information storing unit 120.

[Step S102] The blood vessel modeling unit 130 sets i to an initial value of "0".

[Step S103] The blood vessel modeling unit 130 arranges a cluster of division points on the $i^{th}$ blood vessel. For example, the blood vessel modeling unit 130 generates division point data $\{(p, f)\}$ based on the centerline data L(i) and the radius data R(i) of the blood vessel. Note that p is positions of the division points, which are represented by 3D coordinates, and f represents values (implicit function values) at the coordinates. The division point data is used in a subsequent process of defining an implicit function. The blood vessel modeling unit 130 arranges, for example, a cluster of division points on a circle with a given radius, placed on a plane perpendicular to the centerline. Details on the division point arranging process are explained later (see FIG. 9).

[Step S104] The blood vessel modeling unit 130 calculates an implicit function defining a blood vessel of Li. The calculation of the implicit function provides a surface (implicit surface) representing the $i^{th}$ blood vessel.

[Step S105] The blood vessel modeling unit 130 determines if the value of i is below n. If the value of i is below n, the blood vessel modeling unit 130 moves to step S106. If the value of i is greater than or equal to n, the blood vessel modeling unit 130 moves to step S107.

[Step S106] The blood vessel modeling unit 130 adds 1 to the value of i and then moves to step S103.

[Step S107] The blood vessel modeling unit 130 blends together the implicit surfaces individually associated with each of the plurality of blood vessels.

[Step S108] Based on the blended implicit surfaces, the blood vessel modeling unit 130 generates a mesh representing the implicit surfaces.

[Step S109] The blood vessel modeling unit 130 stores, in the mesh model data storing unit 140, mesh model data representing the shape of the coronary artery.

The above-described procedure allows generation of a coronary artery mesh model. Next, the division point arranging process is explained in detail.

Figure 9:
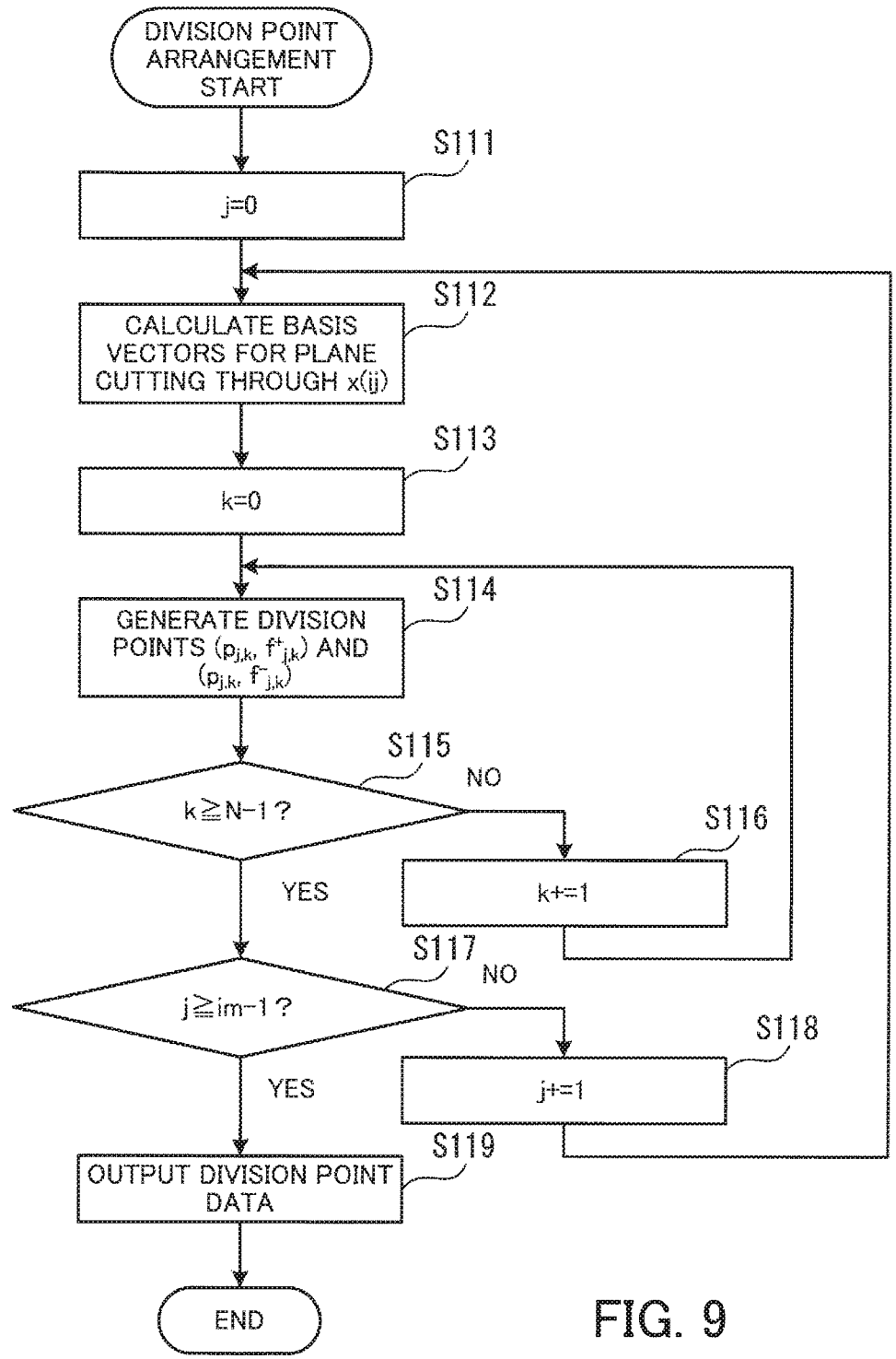
FIG. 9 is a flowchart illustrating an exemplary procedure of a division point arranging process.

FIG. 9 is a flowchart illustrating an exemplary procedure of the division point arranging process. The process of FIG. 9 is described according to the step numbers in the flowchart.

[Step S111] The blood vessel modeling unit 130 sets j to an initial value of "0".

[Step S112] The blood vessel modeling unit 130 calculates basis vectors for a plane cutting through the point at x(ij).

Figure 10:
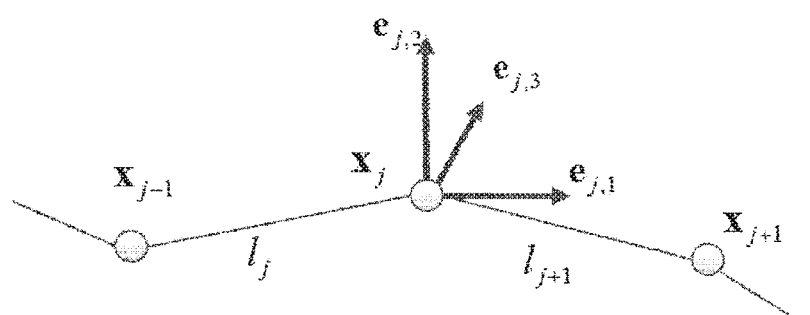
FIG. 10 illustrates exemplary calculation of basis vectors.

FIG. 10 illustrates exemplary calculation of basis vectors. A line segment $l_j$ connecting the j−1th node $x_{j-1}$ and the $j^{th}$ node $x_j$ on a centerline is defined as follows: $|v_j - v_{j-1}|$, where $v_{j-1}$ is the vector indicating the position of the node $x_{j-1}$ and $v_j$ is the vector indicating the position of the node $x_j$. In this situation, the blood vessel modeling unit 130 calculates, for example, basis vectors ($e_{j,2}$, $e_{j,3}$) defining a plane perpendicular to the centerline using the Frenet frame as follows.

$$c'_j = \frac{dc(l_j)}{dl} = \frac{x_{j+1}}{2l_{j+1}} - \frac{x_{j-1}}{2l_j} + \frac{x_j(l_{j+1} - l_j)}{2l_{j+1}l_j} \quad (1)$$

$$c''_j = \frac{d^2c(l_j)}{dl^2} = \frac{x_{j+1}}{l_{j+1}} + \frac{x_{j-1}}{l_j} - \frac{x_j(l_{j+1} + l_j)}{l_{j+1}l_j} \quad (2)$$

$$e_{j,1} = \frac{c'_j}{|c'_j|} \quad (3)$$

$$e_{j,2} = \frac{c''_j}{|c''_j|} \quad (4)$$

$$e_{j,3} = e_{j,1} \times e_{j,2} \quad (5)$$

Note that $c'_j$ and $c''_j$ are the first- and second-order differentials, respectively, with respect to a length l (l is a positive real number) of the line segment when the line segment data is approximated by a curve equation (c(l)) as a function of the length l.

Now refer back to FIG. 9.

[Step S113] The blood vessel modeling unit 130 sets k to an initial value of "0".

[Step S114] The blood vessel modeling unit 130 generates division points $(p_{j,k}, f^+_{j,k})$ and $(p_{j,k}, f^-_{j,k})$. Here is how to generate the division points.

The basis vectors ($e_{j,2}$, $e_{j,3}$) obtained in step S112 define the plane cutting through the node $x_j$ and intersecting at a right angle with the centerline of the blood vessel. A point on the plane is represented by $(x_j + \alpha e_{j,2} + \beta e_{j,3})$, where α and β are arbitrary real numbers. Therefore, the division points $(p_{j,k}, f^+_{j,k})$ and $(p_{j,k}, f^-_{j,k})$ for generating an implicit function at the node $x_j$ are defined as follows.

$$(p_{j,k}, f_{j,k}^+) = (x_j + (r_j + \varepsilon)\{(\cos\theta_k)e_{j,2} + (\sin\theta_k)e_{j,3}\}, \varepsilon) \quad (6)$$

$$(p_{j,k}, f_{j,k}^-) = (x_j + (r_j + \varepsilon)\{(\cos\theta_k)e_{j,2} + (\sin\theta_k)e_{j,3}\}, -\varepsilon) \quad (7)$$

Note that ε is a value indicating a difference between the radius of the blood vessel around the node $x_j$ and the distance from the node $x_j$ to the corresponding division point (i.e., a margin of error), and takes a value greater than 0 and less than r.

Figure 11:
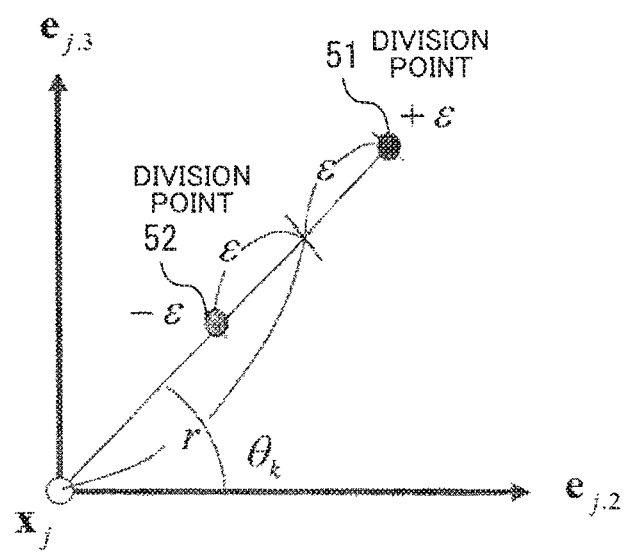
FIG. 11 illustrates an exemplary arrangement of division points.

FIG. 11 illustrates an exemplary arrangement of division points. FIG. 11 is a view from a direction perpendicular to the plane including ($e_{j,2}$, $e_{j,3}$). In the example of FIG. 11, the radius of the blood vessel around the node $x_j$ is r (r is a positive real number). A division point 51 is located at (r+ε) away from the node $x_j$. A division point 52 is located at (r−ε) away from the node $x_j$.

The division points (p, f) are set for each k in $\theta_k = k(2\pi/N)$, where k=0, ..., and N−1. This enables division points to be arranged in a circle around the node $x_j$ on the centerline, on a plane perpendicular to the centerline. N is an integer greater than or equal to 1.

Note that the isosurface of an implicit function (blood vessel surface) is located between points each having a value of +ε and points each having a value of −ε. Therefore, if 0<ε<r is true, it is possible to calculate the blood vessel surface using an implicit function. Note however that the following equation defines the optimal value of ε in terms of bringing the deviation from the radius of the blood vessel, indicated by the blood vessel information, to minimum and smoothing the shape of the blood vessel.

$$\varepsilon = \left[ \underset{r_j}{\arg\min}\{r_j\} \right] \times 0.1 \tag{8}$$

In Equation (8), "arg min{$r_j$}" (N.B. "$r_j$" is attached below "min") is the minimum value amongst the radii of the blood vessel, indicated by the blood vessel information. The value of ε being too large increases the likelihood that the isosurface does not coincide with the radius r around the node $x_j$. That is, an error for the given radius r occurs within the range of ±ε. In view of this, the value of ε may be considered desirable if it is smaller; however, due to the numerical calculations, ε being larger leads to a smooth and stable function as long as ε does not exceed r. Therefore, it is considered appropriate that the error in the radius of the blood vessel is an order of magnitude smaller than the radius. As a result, ε is defined here as a value obtained by multiplying the measured minimum radius of the blood vessel by 0.1.

Now refer back to FIG. 9.

[Step S115] The blood vessel modeling unit 130 determines whether k is greater than or equal to N−1. If k≥N−1, the blood vessel modeling unit 130 moves to step S117. If k<N−1, the blood vessel modeling unit 130 moves to step S116.

[Step S116] The blood vessel modeling unit 130 adds 1 to k and then moves to step S114.

[Step S117] The blood vessel modeling unit 130 determines whether j is greater than or equal to im−1. If j≥im−1, the blood vessel modeling unit 130 moves to step S119. If j<im−1, the blood vessel modeling unit 130 moves to step S118.

[Step S118] The blood vessel modeling unit 130 adds 1 to j and then moves to step S112.

[Step S119] The blood vessel modeling unit 130 outputs division point data indicating coordinates of the generated division points. For example, the blood vessel modeling unit 130 stores the division point data in the memory 102.

In the above-described manner, the division points are arranged.

Figure 12:
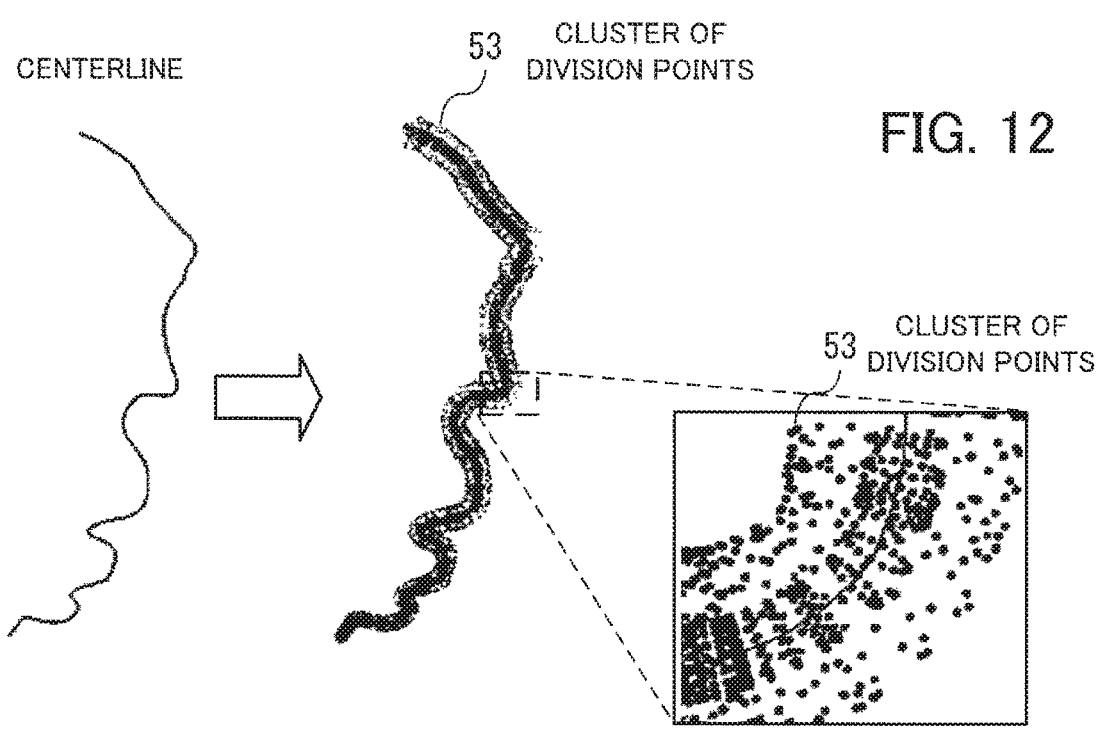
FIG. 12 illustrates an exemplary cluster of arranged division points.

FIG. 12 illustrates an exemplary cluster of arranged division points. As illustrated in FIG. 12, a cluster of division points 53 is arranged around the centerline of the blood vessel. Using such a cluster of division points 53, an implicit function is calculated.

How to define an implicit function is described next.

For division points {pi, fi}, an implicit function f(x) is defined as follows.

$$f(x) = \sum_{j=1}^{m} a_j \phi_j(x) + b_0 + b_1 \cdot x \tag{9}$$

$$\phi_i(x) = -|x - p_i| \tag{10}$$

As for the implicit function f(x), individual coefficients $a_j$, $b_0$, and $b_1$ are found by minimizing the sum of squares of errors from each implicit function value fi at the corresponding division point pi. Herewith, it is possible to define an implicit function having an isosurface that corresponds to the shape being modeled. Further, once condition to stabilize the implicit function to be defined is set, the following matrix equation is solved to thereby define the implicit function.

$$f = (M + \lambda I)a + Nb_0 \tag{11}$$

Note here that f, M, a, N, and $b_0$ are individually defined as follows.

$$f = \begin{pmatrix} f_1 \\ f_2 \\ \vdots \\ f_m \end{pmatrix} \tag{12}$$

$$M = \begin{pmatrix} \phi_1(p_1) & \phi_2(p_1) & \cdots & \phi_m(p_1) \\ \phi_1(p_2) & \phi_2(p_2) & \cdots & \phi_m(p_2) \\ \vdots & \vdots & \ddots & \vdots \\ \phi_1(p_m) & \phi_2(p_m) & \cdots & \phi_m(p_m) \end{pmatrix} \tag{13}$$

$$N = \begin{pmatrix} 1 & p_{1,1} & \cdots & p_{1,n} \\ 1 & p_{2,1} & \cdots & p_{2,n} \\ \vdots & \vdots & \ddots & \vdots \\ 1 & p_{m,1} & \cdots & p_{m,n} \end{pmatrix} \tag{14}$$

$$b_0 = \begin{pmatrix} b_0 \\ b_1 \\ \vdots \\ b_n \end{pmatrix} \tag{15}$$

$$a = \begin{pmatrix} a_1 \\ a_2 \\ \vdots \\ a_m \end{pmatrix} \tag{16}$$

I in Equation (11) is an identity matrix. The column vector in Equation (16) is the coefficient $a_j$. The first element of the column vector of Equation (15) is the coefficient $b_0$. In addition, the second and subsequent elements ($b_1$, $b_2$, ..., and $b_n$) of the column vector of Equation (15) are the coefficient $b_1$.

Figure 13:
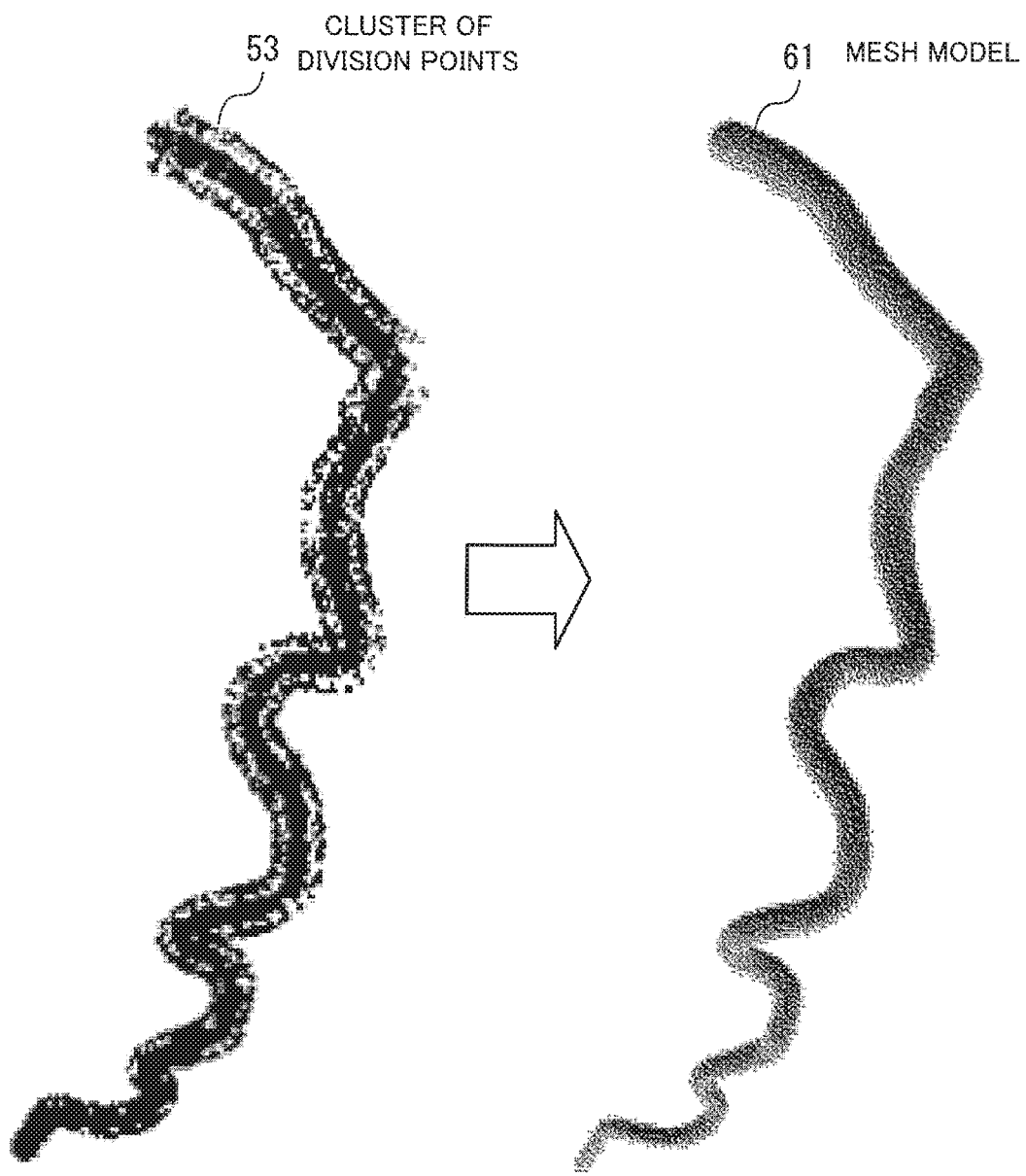
FIG. 13 illustrates a result of calculating an implicit function.

FIG. 13 illustrates a result of calculating an implicit function. FIG. 13 depicts a mesh model 61 generated by forming a triangle mesh on the isosurface of the implicit function, obtained by calculating the implicit function based on the cluster of division points 53.

A mesh model similar to the mesh model 61 of FIG. 13 is generated for each blood vessel. Then, implicit surfaces which are generators of the individual generated mesh models are blended together, and a mesh model is created based on the blended implicit surfaces, to thereby generate a coronary artery mesh model.

For example, the blood vessel modeling unit 130 blends together implicit surfaces generated for individual blood vessels to form a single implicit surface. Assume, for example, that n implicit functions {$F_i(x)$} (i=1, ..., and n) have been defined for n blood vessels. The n implicit functions {$F_i(x)$} are blended together to form an implicit function F(x) defined below.

$$F(x) = \min\{F_1(x), F_2(x), \ldots, F_n(x)\} \tag{17}$$

Figure 14:
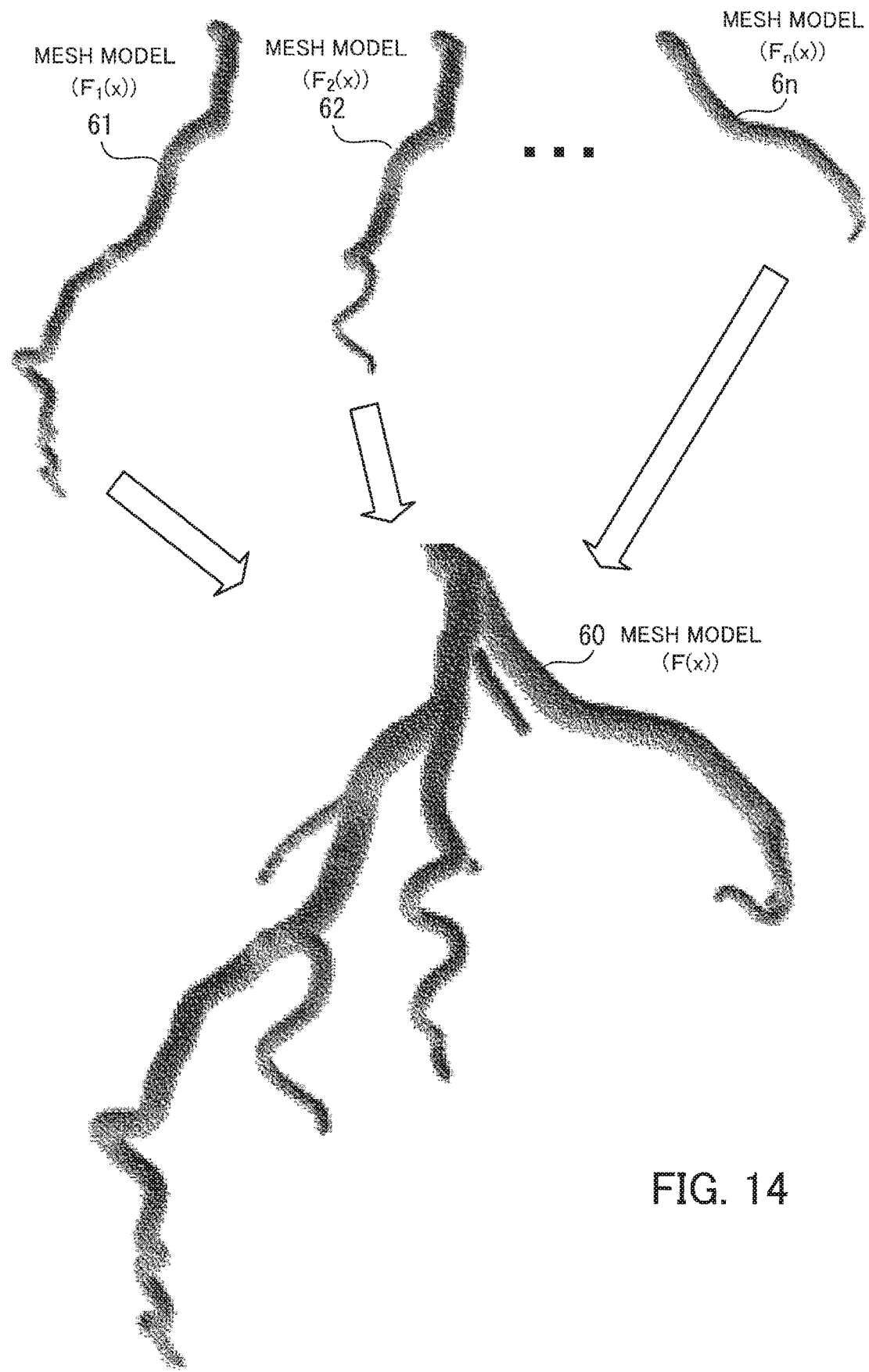
FIG. 14 illustrates an exemplary mesh model generated by blending implicit functions together.

FIG. 14 illustrates an exemplary mesh model generated by blending implicit functions together. An implicit surface is defined based on each of the implicit functions $F_1(x)$, $F_2(x)$, ..., and $F_n(x)$. FIG. 14 depicts mesh models 61,

62, . . . , and 6*n*, each obtained by dividing the implicit surface of the corresponding blood vessel into a plurality of triangular facets.

By blending together the implicit surfaces for the individual blood vessels, the implicit function (F(x)) representing a union of the implicit surfaces defines a single implicit surface. The defined implicit surface is divided into triangular mesh elements, to thereby generate a coronary artery mesh model 60.

As has been described above, the coronary artery mesh model is created based on the implicit function F(x) obtained by blending together the implicit functions $F_1(x)$, $F_2(x)$, . . . , and $F_n(x)$ for individual blood vessels. The coronary artery mesh model thus created represents the natural morphology of blood vessels.

Figure 15:
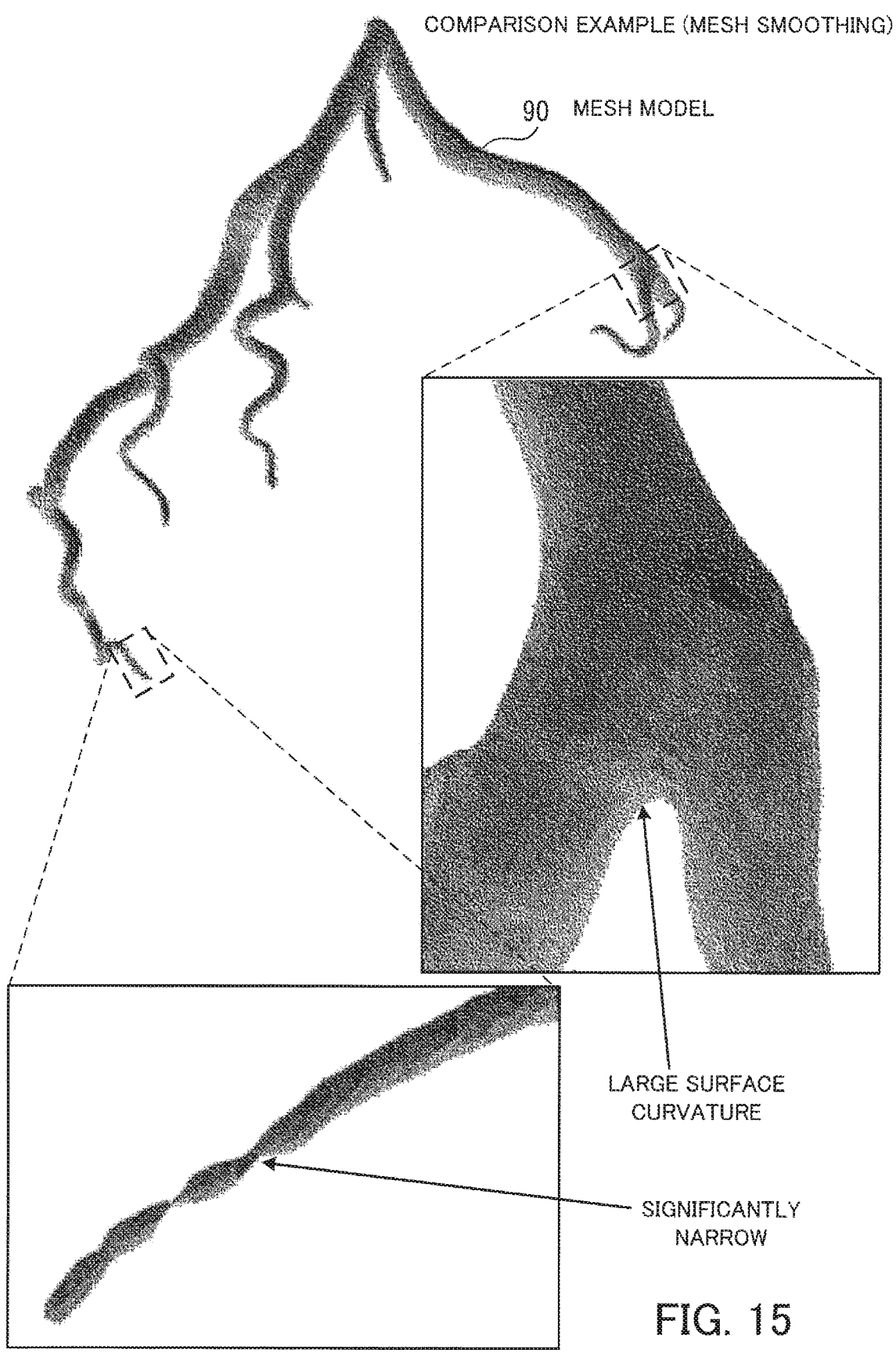
FIG. 15 illustrates a mesh model (comparison example) whose surface has been made smooth by mesh smoothing.
Figure 16:
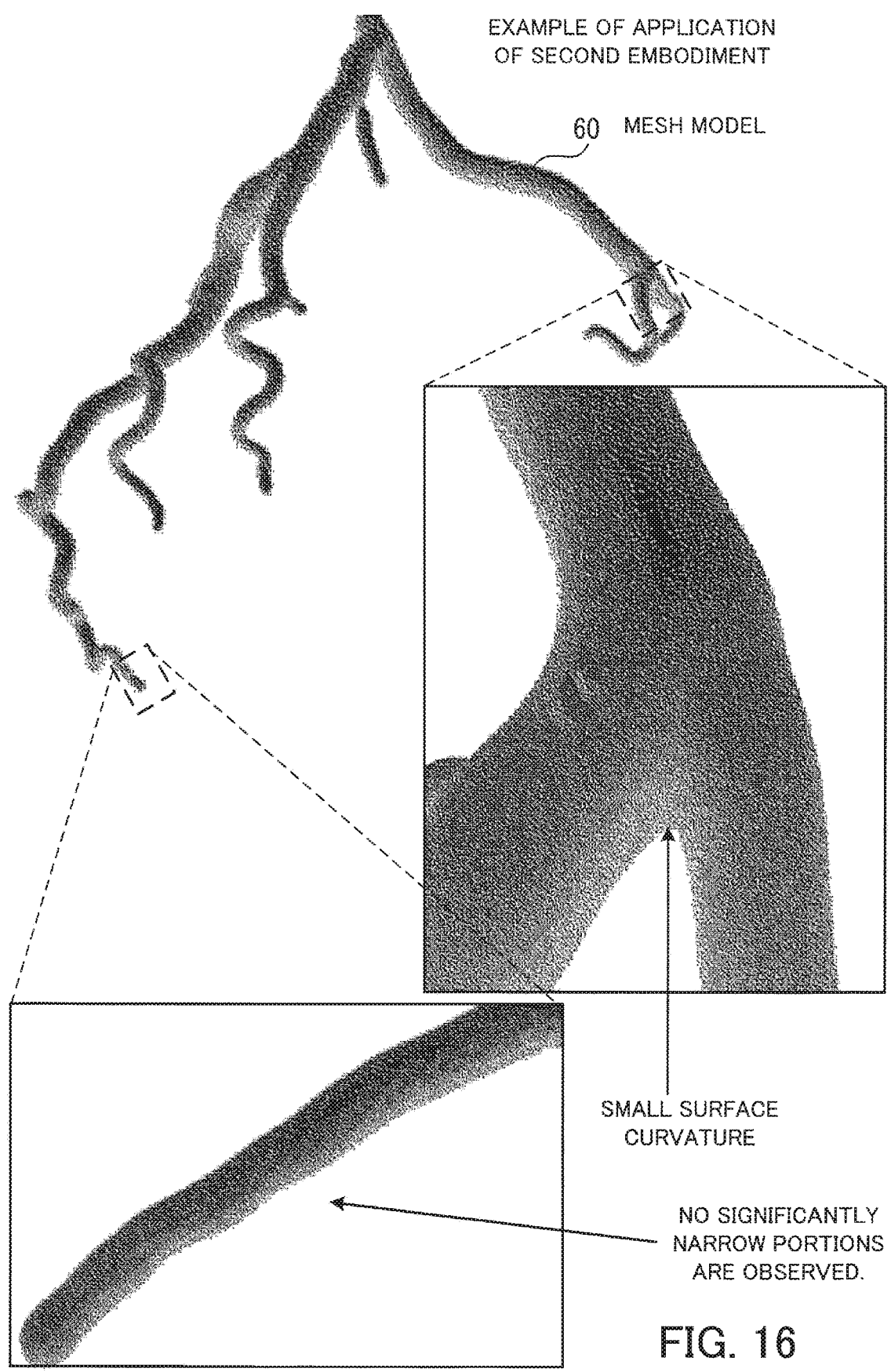
FIG. 16 illustrates an exemplary mesh model whose surface has been made smooth by applying the second embodiment.

Next described are differences between a mesh model whose surface is made smooth by mesh smoothing and a mesh model whose surface is made smooth by the method according to the second embodiment, with reference to FIGS. 15 and 16.

FIG. 15 illustrates a mesh model (comparison example) whose surface has been made smooth by mesh smoothing. As a result of mesh smoothing, a mesh model 90 of FIG. 15 includes unnaturally large surface curvature at the branching of blood vessels. In addition, due to overly applied smoothing, the distal segment of the coronary artery has significantly narrow portions.

FIG. 16 illustrates an exemplary mesh model whose surface has been made smooth by applying the second embodiment. The mesh model 60 of FIG. 16 is created based on an implicit surface obtained by blending together implicit surfaces of a plurality of blood vessels representing the shape extending from the root to the distal branches. As a result, the mesh model 60 exhibits small surface curvature at the branching of blood vessels, being free from the problem of unnaturally large surface curvature. In addition, no significantly narrow portions are observed in the distal segment of the coronary artery.

As can be seen by comparing the mesh model 90 of the comparison example of FIG. 15 and the mesh model 60 of FIG. 16, produced by application of the second embodiment, the application of the second embodiment achieves modeling more faithful to the morphology of blood vessels, specially at their branching parts and distal branches.

The use of the mesh model 60, which represents the natural morphology of blood vessels, in fluid simulation greatly improves the accuracy of the simulation. In other words, if a blood flow simulation of a coronary artery is run based on the unnatural shaped mesh model 90 of FIG. 15, the simulation may perform poorly with a low degree of accuracy for branching parts and distal branches of blood vessels. On the other hand, if the mesh model 60 produced by application of the second embodiment is used to run the blood flow simulation, it is possible to reproduce natural blood flows faithful to real-life.

(c) Other Embodiments

The second embodiment is described above using an example of generating a mesh model of a coronary artery; however, a mesh model of different blood vessels may be produced in a similar manner.

According to the second embodiment, blood vessel-specific implicit functions of a plurality of blood vessels are blended together to form an implicit function representing the morphology of a coronary artery, and a mesh model is then generated based on the formed implicit function; however, mesh models for individual blood vessels may be created from the blood vessel-specific implicit functions and then blended together to form a mesh model.

According to an aspect, it is possible to generate a mesh model representing the natural morphology of blood vessels.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A biological model generating apparatus comprising:
    a memory configured to store blood vessel information indicating a centerline of a blood vessel and radii of the blood vessel at a plurality of nodes on the centerline; and
    a processor configured to execute a process including:
        establishing, with respect to each of the plurality of nodes, based on the blood vessel information, a first circle and a second circle on a plane cutting through the node and intersecting the centerline at a right angle, the first circle centering at the node and having a first radius obtained by adding a margin of error to the radius of the blood vessel at the node, and the second circle centering at the node and having a second radius obtained by subtracting the margin of error from the radius of the blood vessel at the node,
        generating an implicit function defining a curved surface that intersects the plane cutting through each of the plurality of nodes, at an inner side of the first circle but an outer side of the second circle, and
        generating a mesh model based on the curved surface defined by the implicit function.

2. The biological model generating apparatus according to claim 1, wherein the generating of the implicit function includes arranging a plurality of division points on the first circle and the second circle on the plane cutting through each of the plurality of nodes, and generating the implicit function based on the plurality of division points.

3. The biological model generating apparatus according to claim 1, wherein:
    the blood vessel information stored in the memory includes information indicating, for each of a plurality of blood vessels, the centerline and the plurality of nodes on the centerline,
    the generating of the implicit function includes generating the implicit function corresponding to the each of the plurality of blood vessels, and
    the generating of the mesh model includes generating a union implicit function that represents a union of a plurality of curved surfaces each defined by the implicit function corresponding to the each of the plurality of blood vessels, and generating the mesh model based on the union of the plurality of curved surfaces represented by the union implicit function.

4. The biological model generating apparatus according to claim 3, wherein the plurality of blood vessels indicated by the blood vessel information shares a common position at one ends thereof.

5. A biological model generating method comprising:

establishing, by a processor, based on blood vessel information indicating a centerline of a blood vessel and radii of the blood vessel at a plurality of nodes on the centerline, with respect to each of the plurality of nodes, a first circle and a second circle on a plane cutting through the node and intersecting the centerline at a right angle, the first circle centering at the node and having a first radius obtained by adding a margin of error to the radius of the blood vessel at the node, and the second circle centering at the node and having a second radius obtained by subtracting the margin of error from the radius of the blood vessel at the node;

generating, by the processor, an implicit function defining a curved surface that intersects the plane cutting through each of the plurality of nodes, at an inner side of the first circle but an outer side of the second circle; and generating, by the processor, a mesh model based on the curved surface defined by the implicit function.

6. A non-transitory computer-readable recording medium storing therein a program that causes a computer to execute a process comprising:

establishing, based on blood vessel information indicating a centerline of a blood vessel and radii of the blood vessel at a plurality of nodes on the centerline, with respect to each of the plurality of nodes, a first circle and a second circle on a plane cutting through the node and intersecting the centerline at a right angle, the first circle centering at the node and having a first radius obtained by adding a margin of error to the radius of the blood vessel at the node, and the second circle centering at the node and having a second radius obtained by subtracting the margin of error from the radius of the blood vessel at the node;

generating an implicit function defining a curved surface that intersects the plane cutting through each of the plurality of nodes, at an inner side of the first circle but an outer side of the second circle; and generating a mesh model based on the curved surface defined by the implicit function.

* * * * *